US012694690B1

(12) United States Patent
Skibelid et al.

(10) Patent No.: US 12,694,690 B1
(45) Date of Patent: Jul. 28, 2026

(54) OBJECT DETECTION UNIT

(71) Applicant: Roboxi AS, Stavanger (NO)

(72) Inventors: Adrian Skibelid, Stavanger (NO);
Markus Dørheim, Stavanger (NO);
Torbjørn Bratland, Stavanger (NO);
Filip Sund, Stavanger (NO)

(73) Assignee: ROBOXI AS (NO)

( * ) Notice: Subject to any disclaimer, the term of this
patent is extended or adjusted under 35
U.S.C. 154(b) by 0 days.

(21) Appl. No.: 19/280,785

(22) Filed: Jul. 25, 2025

(51) Int. Cl.
| | |
|---|---|
| *G06K 9/00* | (2022.01) |
| *G06T 7/11* | (2017.01) |
| *G06T 11/23* | (2026.01) |
| *G06V 10/20* | (2022.01) |
| *G06V 10/22* | (2022.01) |
| *G06V 10/25* | (2022.01) |

(Continued)

(52) U.S. Cl.
CPC ................ *G06V 20/58* (2022.01); *G06T 7/11*
(2017.01); *G06T 11/23* (2026.01); *G06V*
*10/225* (2022.01); *G06V 10/25* (2022.01);
*G06V 10/255* (2022.01); *G06V 10/764*
(2022.01); *G06T 2207/20081* (2013.01); *G06T*
*2207/30201* (2013.01); *G06T 2207/30232*
(2013.01); *G06T 2210/12* (2013.01)

(58) Field of Classification Search
CPC ...... G06V 20/58; G06V 10/25; G06V 10/255;
G06V 10/764; G06V 10/225; G06T 7/11;
G06T 11/203; G06T 2207/20081; G06T
2207/30201; G06T 2207/30232; G06T
2210/12
See application file for complete search history.

(56) References Cited

U.S. PATENT DOCUMENTS

| | | | | | |
|---|---|---|---|---|---|
| 11,783,612 | B1* | 10/2023 | Kuo | .................... | G06V 40/103 |
| | | | | | 382/100 |
| 2004/0062437 | A1* | 4/2004 | Luo | .......................... | G06T 3/40 |
| | | | | | 382/232 |

(Continued)

FOREIGN PATENT DOCUMENTS

| | | |
|---|---|---|
| WO | 2020109603 A1 | 6/2020 |

OTHER PUBLICATIONS

Schwartz, Eli, et al. "Maeday: Mae for few-and zero-shot AnomalY-Detection." Computer Vision and Image Understanding 241 (2024): 103958. (Year: 2024).*

(Continued)

*Primary Examiner* — Avinash Yentrapati
(74) *Attorney, Agent, or Firm* — POLSINELLI PC

(57) ABSTRACT

The present disclosure relates to an object detection unit for detecting the presence of foreign object debris, FOD, on a runway, taxiway or apron surface, the object detection unit comprising a processor, the object detection unit configured to: receive an image taken by a camera, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box; obtain, from the zero-shot object detection model, co-ordinates of a bounding box around a candidate FOD in the image and a likelihood that the candidate FOD is foreign object debris; and determine if the likelihood exceeds a threshold value.

19 Claims, 10 Drawing Sheets

(51) Int. Cl.
G06V 10/764 (2022.01)
G06V 20/58 (2022.01)

(56) References Cited

U.S. PATENT DOCUMENTS

| | | | |
|---|---|---|---|
| 2016/0171852 A1* | 6/2016 | Lin | G06V 20/52 |
| | | | 382/103 |
| 2022/0044045 A1* | 2/2022 | Grancharov | G06V 10/761 |
| 2022/0101271 A1* | 3/2022 | Steine | E01H 1/001 |
| 2023/0196874 A1* | 6/2023 | Quinn | G06V 40/161 |
| | | | 382/103 |
| 2024/0265715 A1* | 8/2024 | Ho | G06V 20/56 |
| 2024/0311987 A1* | 9/2024 | Schwartz | G06N 3/0455 |
| 2024/0331163 A1* | 10/2024 | Feng | G06V 10/762 |
| 2024/0395027 A1* | 11/2024 | Shen | G06N 3/045 |
| 2025/0061714 A1* | 2/2025 | Bharadwaj | G06V 10/462 |
| 2025/0136130 A1* | 5/2025 | Shetty | B60W 60/001 |
| 2025/0136134 A1* | 5/2025 | Shetty | B60W 50/14 |
| 2025/0225609 A1* | 7/2025 | Reddy | G06V 10/56 |
| 2025/0299463 A1* | 9/2025 | Shin | G06V 10/82 |

OTHER PUBLICATIONS

Li, Yiting, et al. "Promptad: Zero-shot anomaly detection using text prompts." Proceedings of the IEEE/CVF Winter Conference on Applications of Computer Vision. 2024. (Year: 2024).*

* cited by examiner

100

21

100

21

| Receive an image taken by a camera | ~ 1101 |

| Input the image into a zero-shot object detection model | ~ 1102 |

| Obtain, from the zero-shot model, co-ordinates of a bounding box around a candidate FOD in the image and a likelihood that the candidate FOD is foreign object debris | ~ 1103 |

OBJECT DETECTION UNIT

BACKGROUND

Maintenance of airport runways and taxiways is a major safety concern in airport operations. The conditions of a runway must be closely monitored to ensure that pilots and air traffic control are kept informed of the current runway conditions and are able to make decisions and adjustments necessary for safe flight operation.

For example, when adverse meteorological conditions cause the runway surface to be wet or icy, a runway friction measurement must typically be carried out to advise pilots and air traffic control of the reduced control and braking power on the runway surface. Other runway conditions, such as runway visibility (RVR) and wind speeds must also be measured. Such measurements can be slow and labour-intensive.

A particular safety concern is that of foreign object debris (FOD) on the surface of runways and taxiways. Objects on the ground surface, including debris from vehicles, broken equipment and in some cases animals such as birds and rodents, can adversely affect fast-moving aircraft. Taxiway and Runway FOD can cause many serious problems, such as tyre puncture, injury to personnel and path blockage. When ingested in a jet engine for example, FOD can cause serious and substantial damage, often leading to deadly engine failures. Foreign object damage is typically mitigated by performing regular and frequent inspection of the airfield by airport staff. In such inspection operations, vast areas across the runways and taxiways must be swept and closely inspected for FOD, which can often be a lengthy and laborious process, as the airfield must be physically traversed.

The deployment of airport staff to monitor runway and taxiway conditions, manually taking measurements and reporting back to air traffic control, is unreliable, expensive and time-consuming. The problem is exacerbated when adverse conditions on the runway or taxiway are discovered and maintenance staff, together with specialist maintenance equipment, has to be deployed.

A multi-functional modular runway monitoring apparatus been proposed in WO2020/109603. While the various sensors and specialist equipment provided with the proposed apparatus go some way in addressing problems of deploying staff to monitor a runway or taxiway surface, further improvements are needed to provide greater efficiency and safety on runways and taxiways; especially considering that the vehicle is a resource constrained environment with limited battery power and processing capabilities.

It is known that machine learning algorithms can be employed to detect and identify objects in an image. However, a challenge in the context of detecting debris on a runway is that the debris may take numerous forms, which may be unexpected, unpredictable, or previously unseen by the machine learning algorithm. Other factors, such as lighting conditions, distance to the object and speed of a vehicle performing the detection also pose challenges for detecting FOD on a runway or taxiway. For example, a runway monitoring apparatus patrolling the runway at night may encounter a previously unseen instance of foreign object debris at some distance from the apparatus, and which may only be visible in a small number of frames. Current approaches are not suited to detect FOD in such circumstances and are therefore unable to provide a comprehensive solution.

SUMMARY OF INVENTION

To address the above discussed problem, the present disclosure provides an object detection unit for detecting the presence of foreign object debris, FOD, on a runway and taxiway surface. The object detection unit uses an image obtained by a camera overlooking the runway, taxiway or apron, and a zero-shot object detection model to determine a likelihood that FOD is present on the runway or taxiway surface. The use of a zero-shot object detection model allows for previously unseen instances of FOD to be detected. This provides a significant advantage in that the model can detect objects on the runway which it has not seen before.

According to an aspect, the present disclosure provides an object detection unit for detecting the presence of foreign object debris, FOD, on a runway, taxiway or apron surface, the object detection unit comprising a processor, the object detection unit configured to: receive an image taken by a camera, the image comprising at least part of the runway surface, taxiway surface or apron surface, input the image to a zero-shot object detection model, wherein the zero shot object detection model is configured to output co-ordinates of a bounding box around a candidate FOD in the image and determine a likelihood that FOD is present in the bounding box; obtain, from the zero shot object detection model, co-ordinates of a bounding box around a candidate FOD in the image and a likelihood that the candidate FOD is foreign object debris; and determine if the likelihood exceeds a threshold value.

It will be appreciated that runways and taxiways are dynamic environments where many different kinds of debris may appear. A zero-shot model is able to respond by being able to detect instances of debris that it has not previously seen, i.e. not been trained on, as well as the instances that it has seen, i.e. been trained on. Accordingly, the object detection unit makes use of a (pre-trained) zero-shot model to analyse an image of the runway or taxiway surface and thereby determine if foreign object debris is present on the surface. The zero-shot model is able to detect foreign object debris in various forms, even if the model has not been trained to detect that particular instance of FOD. For example, a zero-shot model may be trained with a large general image data set, so that the model learns a vector space of embeddings. By learning the vector space of embeddings, the model can detect combinations or objects that it has not encountered previously.

The above approach develops human based approaches and computer vision approaches. Compared to human approaches, the zero-shot model is able to work on limited information, such as a single frame or a few frames such as 2, 3 or 4 frames, and is able to work in low-light conditions or adverse weather. The zero-shot object detector can also detect multiple objects per frame and detect objects that a human operator may miss. Compared to conventional computer vision approaches, the zero-shot model provides a considerable advantage in that it is able to detect previously unseen instances of FOD, whereas conventional supervised approaches can only detect objects that were labelled during training. Such models are in a sense, static, as they cannot identify FOD on the runway or taxiway that they have not seen, which is a clear drawback in a dynamic environment such as a runway or taxiway.

The zero-shot object detection model may be a trained or pre-trained zero-shot object detection model.

The above mentioned camera may be implemented as one or more cameras, and in certain examples it would be advantageous to provide an array of a plurality of cameras mounted on a vehicle that patrols the runway taxiway or apron.

The above mentioned co-ordinates may be implemented in any suitable co-ordinate system. For example, Cartesian co-ordinates may be appropriate, but any other co-ordinate system such as a polar co-ordinate system could be used.

Further, in some examples, when the likelihood exceeds the threshold value, the object detection unit may be configured to: compare the region of the image inside the bounding box to a set of known objects; and either: determine that the candidate FOD matches a known object and discard the bounding box; or determine that the candidate FOD does not match a known object.

In this way, the number of false-positive detections made by the object detection unit can be reduced. In particular, objects in an image which are expected to be present are not considered to be FOD, and therefore are not a cause for concern. As an example, runway lights and runway markings might be detected as FOD by the zero-shot object detector. However, these are supposed to be present, and indeed their absence would represent more of a hazard. Therefore, any detections that match a known object are discarded.

As used above a "region of the image" is intended to refer to a portion of the image where the potential FOD is located, and may be represented by a box drawn around the potential FOD.

The above referenced likelihood may be a number between 0 and 1, or a percentage between 0% and 100%. The threshold for performing the known object detection may be 0.004 (i.e. 0.4%) or above. In other words, when the zero-shot object detection models determines that the likelihood of FOD being present in the image exceeds the likelihood that FOD is not present in the image, known-object filtering is performed.

In some further examples, the object detection unit may further be configured to: divide the image into a first set of pixels and a second set of pixels, the first set of pixels comprising pixels that represent the runway, taxiway or apron, the second set of pixels comprising pixels that represent regions of the image other than the runway, taxiway and apron; and discard the bounding box when pixels in the bounding box consist of pixels in the second set of pixels.

A challenge with using a zero-shot object detection model is that the model can struggle to discriminate between objects in the foreground and the background of the image. For example, the zero-shot object model may consider parts of the sky or the area adjacent to the runway as being foreign object debris. To counter this, the disclosure segments the obtained image into a runway or taxiway region and discards any detections found in the remainder of the image. In other words, the image is segmented into a runway or taxiway region, which shows the runway, taxiway or apron, and a peripheral region, which shows other than the runway, taxiway or apron. For example, the peripheral region may include a visual representation of the sky, or the areas adjacent to the runway. By discarding these portions of the image, any detections made therein are removed from consideration, which further reduces the number of false-positive results that are produced.

In addition to the above, when the likelihood exceeds the threshold value, the object detection unit is further configured to: locate a center of the bounding box based on the co-ordinates of the bounding box; trace a ray from a focal point of the camera to the center of the bounding box in the imaginary image plane of the camera sensor of the camera; and determine a position of the candidate FOD on the surface based on the intersection of the ray with the surface.

In some implementations, the foreign object debris may comprise a plurality of objects, and the object detection unit is configured to: output co-ordinates of a respective bounding box around each candidate FOD in the image, wherein at least two bounding boxes around two separate candidate FODs objects intersect, and the object detection unit is further configured to: replace the intersecting bounding boxes with one bounding box around the candidate FODs.

Therefore, in a situation where multiple instances of foreign object debris are found in close proximity, such that their bounding boxed at least partially overlap or intersect, the partially overlapping or intersecting bounding boxes are replaced with one bounding box that encompasses the instances of candidate foreign object debris that are in close proximity. This streamlines further processing by reducing the number of bounding boxes to be processed.

In some advantageous implementations, when the object detection unit determines that the candidate FOD does not match a known object, the object detection unit is configured to: determine that the candidate FOD is foreign object debris; and send, an alert comprising the metadata associated with the image to a control station of a vehicle for monitoring and reporting runway, taxiway and apron surface conditions.

Once a threshold degree of certainty is reached that FOD is present on the surface, the supervisor of the vehicle benefits by being notified at the earliest opportunity. To this end, the object detection unit is configured to send an alert, i.e. an alert message, to a control station of the vehicle, which informs the supervisor that FOD is likely present on the surface. This allows the supervisor to be alerted before the image is sent to them, allowing them to take quick action to ensure that the runway remains safe.

Further, for the sake of improving efficiency, the object detection unit may further be configured to: draw, based on the co-ordinates of the bounding box, a bounding box around the foreign object debris in the image; downscale regions of the image outside the bounding box to create a partially downscaled version of the image; and send the partially downscaled version of the image to the control station of the vehicle.

In this way, the relevant information in the image is transmitted to the control station and the supervisor in an efficient manner. That is, the bounding box may be considered a region of interest, while parts of the image outside of the bounding box are considered to not be of immediate interest. By downscaling the parts of the image outside the bounding box, the amount of data to be transferred is reduced, while at the same time the supervisor is provided with a clear image of the FOD located on the runway, taxiway or apron surface.

In some further advantageous examples, the object detection unit may further be configured to: split the image into a plurality of sub-images; wherein inputting the image to zero-shot object detection model comprises inputting each of the plurality of sub-images to the zero-shot object detection model.

The sub-images may be input serially into the zero-shot model, or may be input in parallel to multiple instances of the zero-shot object detection model to achieve parallel processing. Further, splitting the image into sub-images reduces the amount of false positive results obtained by the zero-shot object detection model. This is because the zero-shot object detection model is provided with more pixels per area of the surface to determine if objects are present in the sub-image or not.

In some examples, the object detection unit may be further configured to: scan the image for human faces; locate a human face in the image; and set values of pixels corresponding to the human face to a preset value. In this way the identity of the human can be concealed.

In an RGB colour space, the present value may be 0, 0, 0, or another value that has the effect of obscuring the face of the human. A corresponding teaching applies to other colour spaces.

It is noted that a human is not treated as FOD. Rather, a human on the runway is considered to be a runway incursion and is dealt with under a different set of protocols.

In examples of the disclosure, the zero-shot object detection model may have been trained on a set of training images, wherein after training the zero-shot object detection model the zero-shot object detection model is configured to detect unseen instances of FOD, wherein unseen instances of FOD comprise instances of FOD absent in the set of training images.

In some advantageous examples, the zero-shot object detection model comprises an open vocabulary detection model, wherein a text prompt is provided to the open vocabulary detection model, the text prompt comprising a description of an object, and the open vocabulary detection model is configured to detect an object in the image that matches the description of the object.

An open vocabulary detection model is a more powerful object detection model that enables objects in any class of object to be detected. A text-prompt is provided to the model telling the model what to look for. By carefully designing the prompt, the open vocabulary detection model is able to find many different kinds of objects in different classes on the runway or taxiway surface. Compared to a zero-shot model, an open vocabulary model is not limited to a fixed number of classes, and it therefore even more versatile than a zero-shot detector. This provides further advantages in the dynamic runway environment, where it is not practical to train a model to recognise every type of FOD that may be found on the runway or taxiway.

The open vocabulary detection model may be a trained or pre-trained object detection model.

A further aspect of the disclosure provides a vehicle for monitoring runway, taxiway and apron surface conditions and remotely reporting the status of the runway, taxiway or apron, the vehicle comprising a detection unit, and a communications unit, the detection unit comprising: an object detection unit; a processor; and a camera configured to obtain an image of at least part of the surface; the object detection unit comprising a processor, the object detection unit configured to: receive an image taken by the camera, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box; obtain, from the zero-shot object detection model, co-ordinates of a bounding box around a candidate FOD in the image and a likelihood that the candidate FOD is foreign object debris; and determine if the likelihood exceeds a threshold value.

Deploying the object detection model on the runway, i.e. at the edge rather than in the cloud practically ensures that the detections can be performed fast and reliably, i.e. without the need to transfer large amounts of image data away from the runway, which is typically challenging due to bandwidth and latency constraints. Further, any privacy concerns that may arise due to the transfer of data where people are visible in the image is avoided.

A further aspect of the disclosure provides a system for monitoring runway, taxiway and apron conditions and performing runway, taxiway and apron maintenance, the system comprising: a vehicle for monitoring runway, taxiway and apron surface conditions and remotely reporting the status of the runway, taxiway or apron, the vehicle comprising a detection unit, the detection unit comprising: an object detection unit; a processor; and a camera configured to obtain an image of at least part of the surface; the object detection unit comprising a processor, the object detection unit configured to: receive an image taken by the camera, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box; obtain, from the zero-shot object detection model, co-ordinates of a bounding box around a candidate FOD in the image and a likelihood that the candidate FOD is foreign object debris; and determine if the likelihood exceeds a threshold value; and the system further comprising: a remote server arranged, in use, to transfer data to and from the object detection unit, via a wired or wireless connection.

In some examples, the system further comprises a control station, the control station comprising: a graphical user interface; a control interface; and a transceiver unit, wherein the transceiver unit is configured to transfer data to and receive data from the object detection unit, via the remote server.

The control station may be physically separate from the remote server, but the control station may alternatively be integrated into the same physical device as the remote server.

In further examples, the control station may further comprise a storage unit for storing data received from a communications module of the vehicle.

In this way the images can be stored for analysis at a late time.

In a further aspect, the disclosure provides a method of monitoring aerodrome runway, taxiway and apron conditions, the method performed by an object detection unit, the method comprising the steps of: receiving an image taken by a camera, the image comprising at least part of the runway surface, taxiway surface or apron surface; inputting the image to a zero-shot object detection model, wherein the zero-shot object detection model is configured to output co-ordinates of a bounding box around a candidate FOD in the image and determine a likelihood that FOD is present in the bounding box; obtaining, from the zero-shot object detection model, co-ordinates of a bounding box around a candidate FOD in the image and a likelihood that the candidate FOD is foreign object debris; and determining if the likelihood exceeds a threshold value.

In some examples, when the likelihood exceeds the threshold value, the method may further comprise: comparing the region of the image inside the bounding box to a set of known objects; and either: determining that the candidate FOD matches a known object and discard the bounding box; or determining that the candidate FOD does not match a known object.

The method may further comprise: dividing the image into a first set of pixels and a second set of pixels, the first set of pixels comprising pixels that represent the runway, taxiway or apron, the second set of pixels comprising pixels that represent regions of the image other than the runway, taxiway and apron; and discarding the bounding box when pixels in the bounding box consist of pixels in the second set of pixels.

Moreover, when the likelihood exceeds the threshold value, the method further may comprise: locating a center of the bounding box based on the co-ordinates of the bounding box; tracing a ray from a focal point of the camera to the center of the bounding box in the imaginary image plane of the camera sensor of the camera; and determining a position of the candidate FOD on the surface based on the intersection of the ray with the surface.

When the foreign object debris comprises a plurality of objects, the method may further comprise: outputting co ordinates of a respective bounding box around each candidate FOD in the image, wherein at least two bounding boxes around two separate candidate FODs intersect; and replacing the intersecting bounding boxes with one bounding box around the candidate FODs.

When the candidate FOD does not match a known object, the method may further comprise: determining that the candidate FOD is foreign object debris; and sending an alert comprising metadata associated with the image to a control station of a vehicle for monitoring and reporting runway, taxiway and apron surface conditions.

The method may further comprise: drawing, based on the co-ordinates of the bounding box, a bounding box around the foreign object debris in the image; downscaling regions of the image outside the bounding box to create a partially downscaled version of the image; and sending the partially downscaled version of the image to the control station of the vehicle.

The method may further comprise: splitting the image into a plurality of sub images; wherein inputting the image to the zero-shot object detection model comprises inputting each of the plurality of sub-images to the zero-shot object detection model.

The method may further comprise: scanning the image for human faces;

locating a human face in the image; and setting values of pixels corresponding to the human face to a preset value.

In some examples, the zero-shot object detection model may comprise an open vocabulary detection model, wherein a text prompt is provided to the open vocabulary detection model, the text prompt comprising a description of an object, and the open vocabulary detection model is configured to detect an object in the image that matches the description of the object.

Advantages provided by the method correspond to the advantages provided by the various aspects and examples discussed above.

In a further aspect, the disclosure provides a computer-readable storage medium comprising instructions, which when executed by a processor, cause the processor to perform a method according aspects disclosed herein.

An aspect of the disclosure provides an object detection unit for detecting the presence of foreign object debris, FOD, on a runway, taxiway or apron surface, the object detection unit comprising a processor, the object detection unit configured to: receive, from a vehicle for monitoring and reporting runway, taxiway and apron surface conditions, an image taken by a camera of the vehicle, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box; obtain, from the zero-shot object detection model, co-ordinates of a bounding box around a candidate FOD in the image and a likelihood that the candidate FOD is foreign object debris; and determine if the likelihood exceeds a threshold value.

BRIEF DESCRIPTION OF DRAWINGS

The invention will be described with reference to the accompanying figures, in which.

DETAILED DESCRIPTION

Examples of the present disclosure relate to an object detection unit for monitoring runway, taxiway and apron surface conditions and remotely reporting the status of the runway, taxiway or apron. The object detection unit is configured to input an image taken by a camera to a (pre-trained) zero-shot object detection model to detect foreign object debris (FOD) on the runway, taxiway or apron. The zero-shot object detection model is trained to detect instances of FOD that it did not see or encounter during training. Using a zero-shot object detection model provides for a runway monitoring vehicle which can respond to encountering previously unseen types of FOD, and is also able to detect FOD in challenging conditions, such as a low-light environment or adverse weather.

The camera may be a stationary camera mounted at an elevated position so as to overlook at least part of the runway, taxiway or apron, or may be mounted to an existing infrastructure such as a building adjacent the surface. The camera may be controllable by an operator to conduct scanning of the runway, taxiway or apron surfaces, or may be configured to periodically scan the runway, taxiway or apron surface.

The camera may also or alternatively be mounted to a vehicle for monitoring and reporting runway, taxiway and apron surface conditions.

This disclosure focusses on the vehicle mounted implementation, but it is to be understood throughout that where an image is obtained, this may be obtained from any suitable camera that is configured to capture an image or at least part of the runway, taxiway, or apron surface, be it a stationary camera or a vehicle mounted camera. The camera may be mounted to a ground based vehicle or aerial vehicle.

Figure 1A:
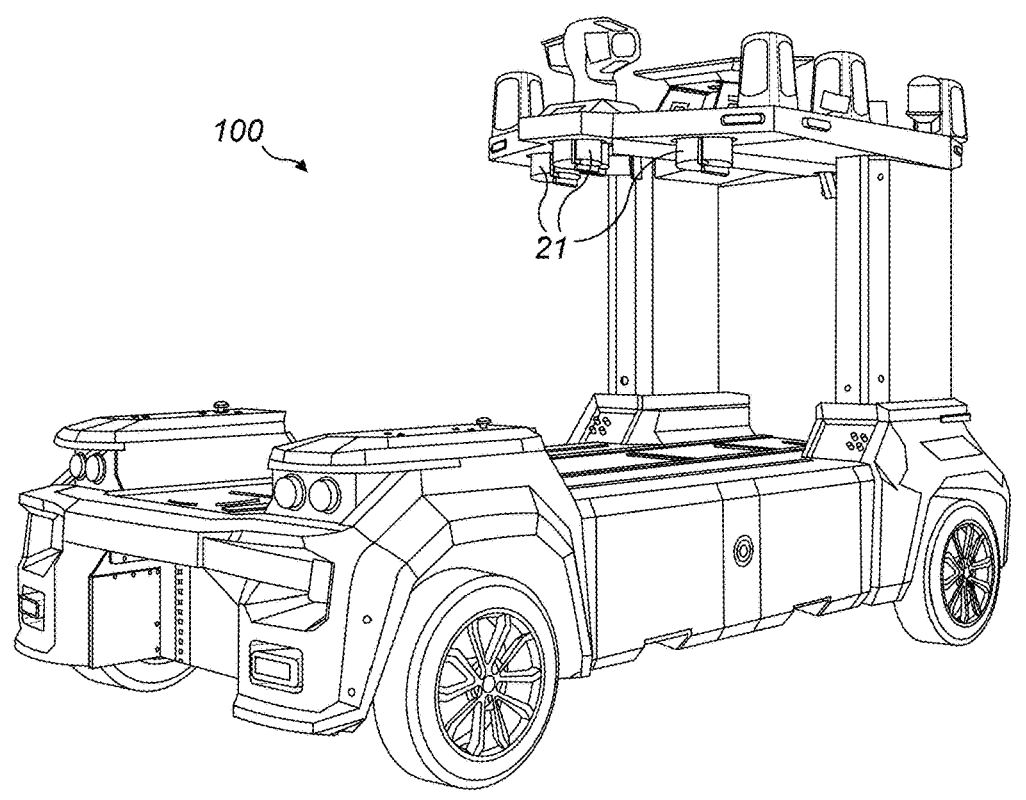
FIGS. 1a and 1b pictorially illustrates an example airport maintenance vehicle with cameras.
Figure 1B:
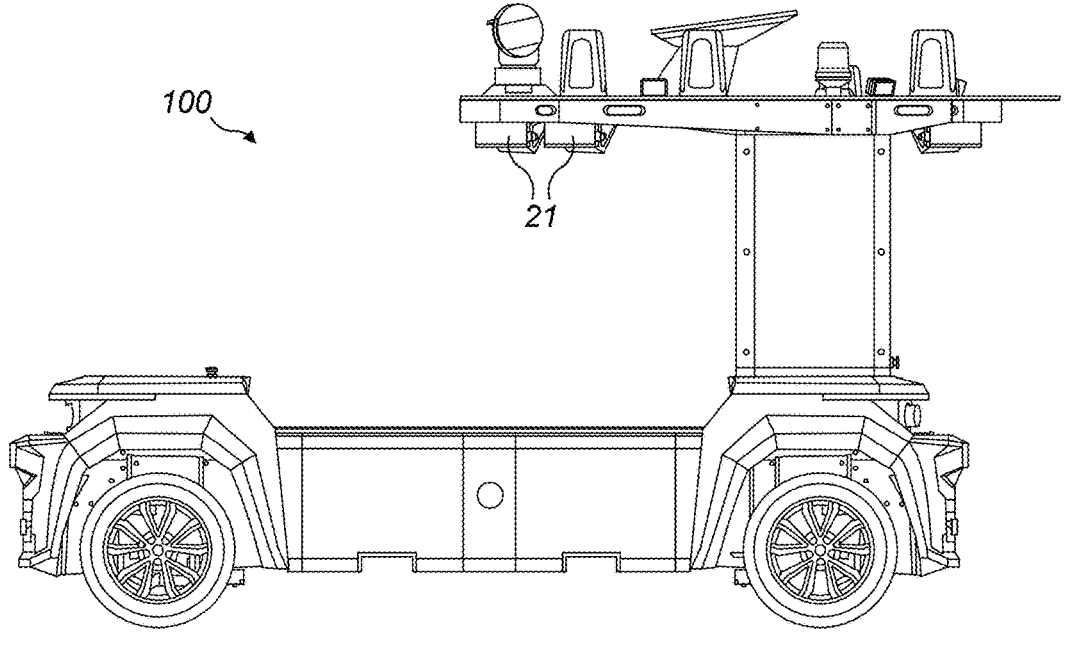

A pictorial representation of a vehicle is shown in FIGS. 1a and 1b. As can be seen in FIGS. 1a and 1b, the vehicle 100 typically includes one or more cameras 21. These may be a pan-tilt-view camera, a front facing camera and/or a rear facing camera. The pan-tilt-zoom camera may be provided at an elevated height with respect to the roof of the vehicle, to provide a greater viewing distance. An array of front facing cameras 21 may be provided.

Other components, such as sensors, sensor arrays, lights, speakers, may be provided on the roof the of the vehicle 100.

The vehicle 100 may monitor surfaces conditions on any airside surface such as a runway, a taxiway, or an apron. Briefly, a runway is an area of the airport that is prepared for take-off and landing of aircraft. A taxiway is a paved pathway at an airport used for aircraft to move between runways, aprons or other facilities. An apron is a paved area at an airport where aircraft are parked, loaded, unloaded, refuelled, or maintained. The presence of aircraft in these areas necessitates that the surfaces of these areas are regularly monitored for the presence of FOD.

References below to a surface should be understood to refer to any of a runway, taxiway or apron.

Figure 2:
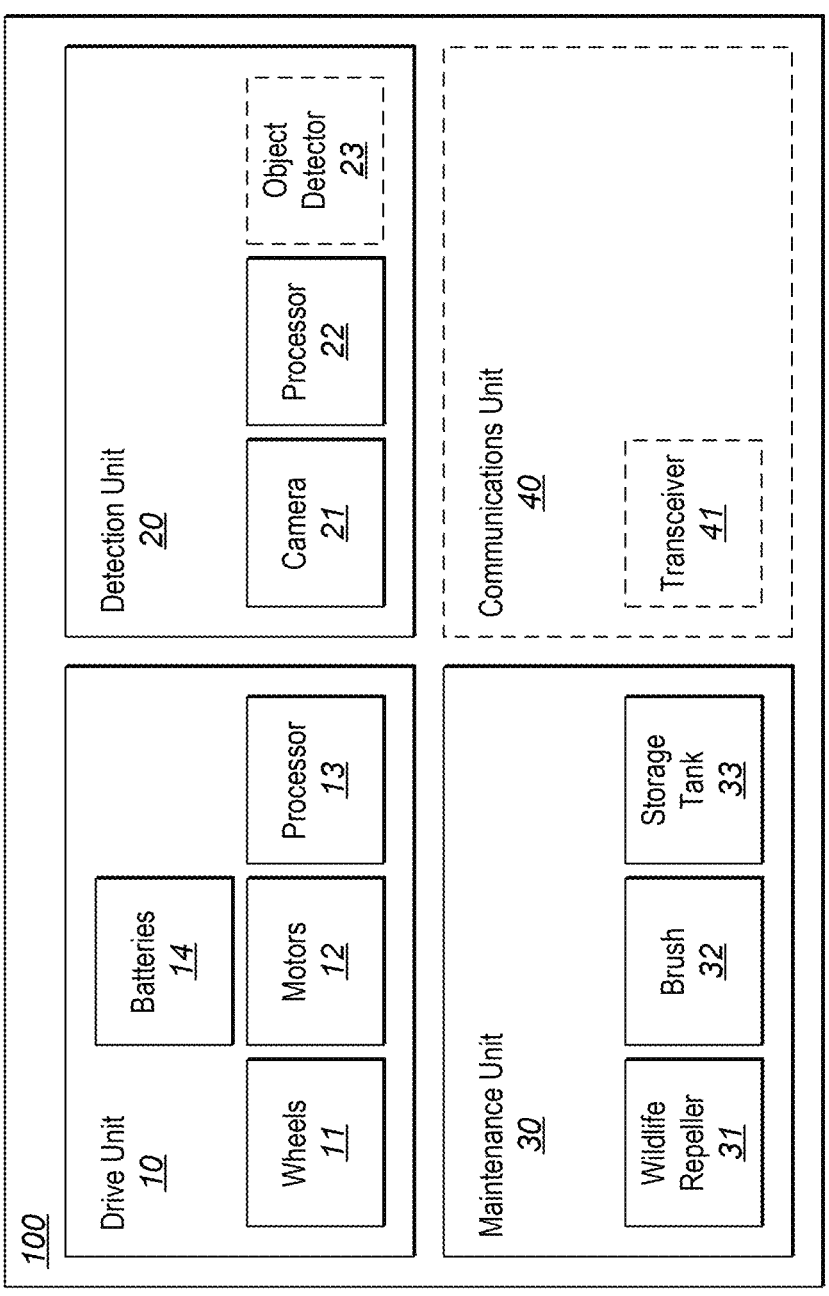
FIG. 2 schematically illustrates an example airport maintenance vehicle.

The example airport maintenance vehicle 100 is schematically illustrated in FIG. 2. The vehicle 100 comprises a drive unit 10, a detection unit 20, a maintenance unit 30 and an optional communications unit 40.

The drive unit 10 comprises component parts required for motion of the vehicle 100. In this example, the drive unit 10 comprises a plurality of independent wheels 11, connected to one or more motors 12, which are powered by one or more batteries 14. The wheels 11 are typically placed at a lower side of the vehicle 100 and are made to contact the ground surface of the runway, apron or taxiway of the aerodrome.

In some examples, the drive unit 10 can also comprise a drive processor 13 configured to output a signal to the motors 12 and wheels 11. In some examples, the drive processor 13 is connected to the optional communications unit 40 to receive and transmit drive data, such as route information and location information. The drive unit 10 can also comprise a stabilising mechanism such as a variable suspension, so as to provide stability to the other components on-board the vehicle 100 when the vehicle 100 is in motion.

The drive unit 10 can be manually operated by a supervisor from a control station, to provide manual remote control over the position and movement of the vehicle 100. Alternatively, the drive unit 10 can be configured to operate autonomously. When operating autonomously, the motion of the vehicle 100 due to the drive unit 10 is dependent on a detected geography of the surroundings. As such, the processor 13 of the drive unit 10 is typically connected to the detection unit 20.

The detection unit 20 comprises one or more sensors configured to detect one or more parameters of the ground surface. In examples, the detection unit 20 includes suitable sensors to facilitate safe autonomous navigation through an aerodrome. For example, the detection unit 20 may comprise a GPS sensor, a terrain sensor, operable to scan and detect terrain surrounding the vehicle 100. In a further example the terrain sensor comprises a Lidar module, having a laser source arranged to output a rotating laser beam. Details of how a Lidar module, or other terrain sensor would be known to a skilled person, and are not elaborated on in detail.

The detection unit 20 typically comprises one or more cameras 21, though as discussed above, the camera 21 may be provided independently of the vehicle 100. The one or more cameras 21 may comprise an optical sensor arranged to capture a still or moving image of the surroundings. In an example, the one or more cameras comprises a visible light camera, which provides visibility of the surroundings of the vehicle 100. The camera can be arranged to detect i.e. capture images of the surrounding surface for example, and data from the camera 21 can be transmitted to the drive unit 10 which can direct and move the vehicle 100 in a direction according to the sensed surface. Furthermore, images from the camera can be transmitted to a remote server, as will be described below. The camera can utilise visible light sensors, infra-red sensors and the like, or combinations thereof.

A high resolution camera is typically preferred to improve the likelihood of correctly detecting the present of FOD. For example, a 16 megapixel camera which produces images with a resolution of 5320×3032 pixels may be suitable.

The detection unit 20 may further comprise an object detection unit 23 configured to detect the presence of FOD in the surface. The object detection unit 23 is typically located on the vehicle 100, i.e. on the edge, as part of detection unit 20. Accordingly, the vehicle comprises one or more suitable GPUs to process images on the vehicle, and suitable memory to store weights of a zero-shot object detection model.

However, in examples of the disclosure the object detection unit 23 is located remotely from the vehicle, i.e. in the cloud, as indicated by the dashed lines of object detection unit 23 as shown in FIG. 2, and may receive images from the camera 21, which may be sent by the communications unit 40. It is therefore contemplated that a camera may be deployed to the airside surfaces, for example mounted to a building adjacent the taxiway, runway or apron, or mounted to vehicle 100 to collect images using the camera 21, and to send the images together with associated data to a remote object detection unit 23 that acts as the detection unit where object detection and other processing can be performed. Any other data collected by other sensors on the vehicle may also be sent to the remote object detection unit 23 for processing. While the cloud implementation provides some advantages in terms of reducing the resource burden of the vehicle, it is also required to provide suitable low latency and high bandwidth connectively between the vehicle 100 and the remote object detection unit 23, to ensure that images and alerts are processed in a timely manner. Creating such connectivity conditions is often challenging in a runway environment, and hence the edge implementation with a vehicle mounted camera is typically preferred.

FOD detection and suitable sensors are generally known to the skilled person. However, according to the disclosure, the present object detection unit 23 may specially be configured to receive an image from the camera, the image comprising a representation, e.g. a visual representation, of at least part of the runway surface, taxiway surface or apron surface; input the image to a (pre-trained) zero-shot object detection model, wherein the zero-shot object detection model is configured to output co-ordinates of a bounding box around a candidate FOD in the image and determine a likelihood that FOD is present in the bounding box, wherein the zero-shot object detection model has been trained on a training set comprising a large image data set, where the model learns a vector space of embeddings. After training the zero-shot object detection model the zero-shot object detection model is configured to detect unseen instances of FOD, wherein the unseen instances of FOD comprise instances of FOD absent in the training set. The zero-shot object detection model is able to detect the unseen instances of FOD based on the learned vector space.

The maintenance unit 30 includes various tools and components for performing maintenance tasks on the runway. A comprehensive set of tools can be provided for completing various maintenance tasks on the runway, for example a brush 32 for sweeping FOD, a vacuum for collecting FOD, a storage tank 33 for storing collected FOD. A wildlife repelling module 31 may also be provided, and may be implemented in a number of ways, such as with a laser, or a loudspeaker configured to output a noise the scares animals away from the runway. Other tools such as a drill, or a hydraulic grab arm mounted on the vehicle may also be provided.

The vehicle 100 optionally further comprises a communications unit 40 comprising a transceiver 41. In implementations the transceiver 41 is configured to transfer data from the various sensors of detection unit 40 and the object detection unit to a remote server. The transceiver 41 is also used to exchange control signals with the remote server, and communicates the control signals to the drive unit 10, thereby allowing the vehicle 100 to be controlled remotely. In implementations where the object detection unit 23 is located remotely from vehicle 100, then the transceiver 41 of the communications unit 40 is configured to exchange data, such as image data, location data, and the like with the object detection unit 23.

In implementations where the communications unit 40 is not present, then the object detection unit 23 is located on the vehicle 100. When FOD is detected in such implementations, then the vehicle completes the necessary maintenance tasks using the tools provided with the maintenance unit. If a situation arises where the vehicle 100 is unable to complete the maintenance task by collecting the FOD, then the vehicle may instead push the FOD to a safe place using a shovel or sweeper attachment. The vehicle 100 may also be configured to stop in place and activate a warning light that airport staff can see and respond to. The vehicle may later perform a bulk transfer of data form the vehicle to a remote server, for example when parked at a docking station.

The optional transceiver 41 of the communications unit 40, can make use of a telecommunications network or a Wi-Fi network to exchange signals with the remote server or object detection unit 23. For example, a 4G or 5G connection can be used, or any future telecommunications network. Such networks provide have the capability to provide high quality of service, and can provide the bandwidth and connection speed needed to ensure timely and accurate exchange of data between the vehicle 100 and the remote server. This in turn improves runway safety, since the vehicle 100 can be reliably remote controlled when needed.

Figure 3:
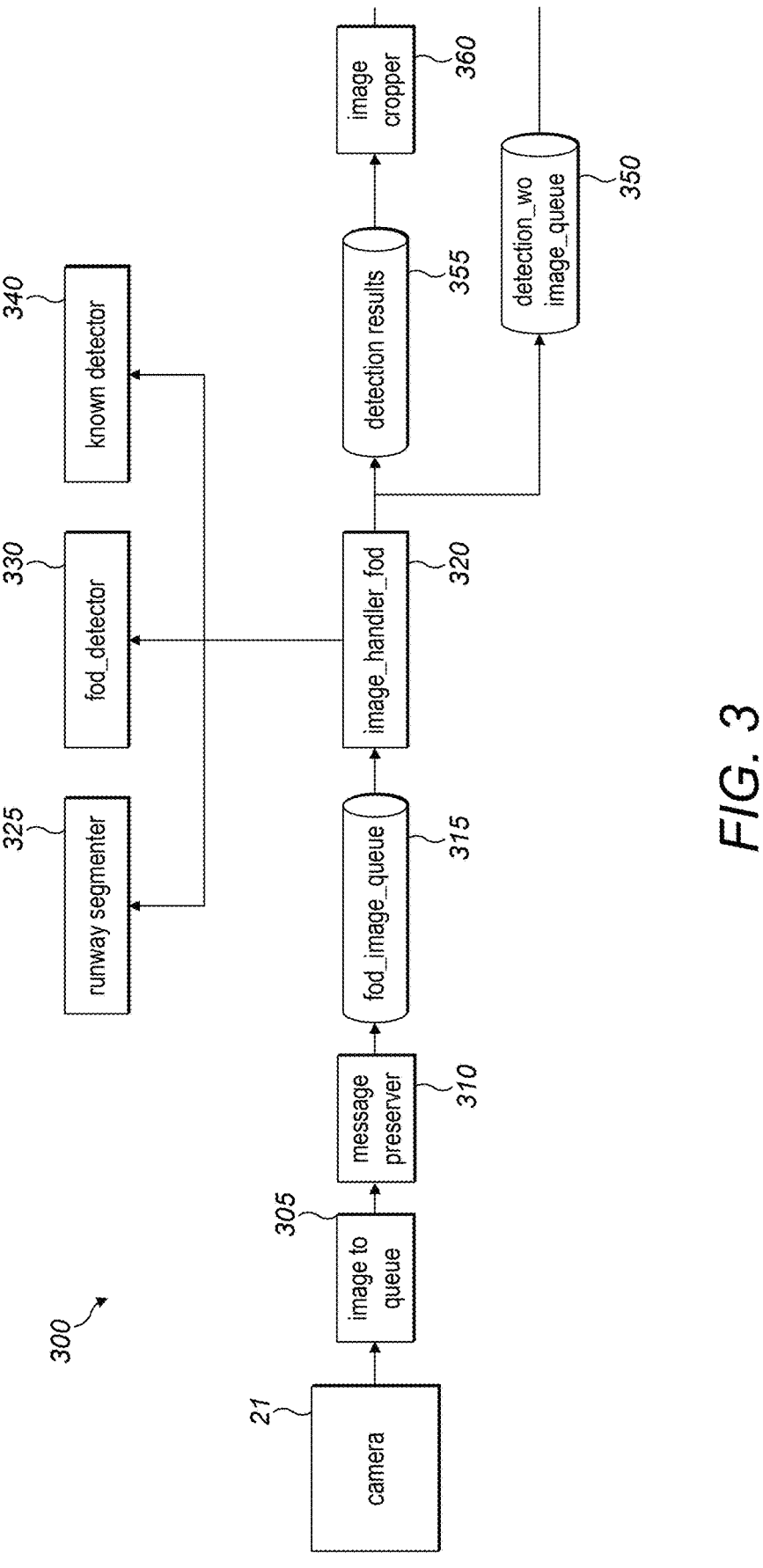
FIG. 3 schematically illustrates a microservice architecture of an object detection module.

Referring now to FIG. 3, the architecture 300 of the object detection unit 23 and various additional functionalities provided by the object detection unit 23 are now described. Object detection unit 300 comprises a plurality of modules that provide different functionalities.

It is to be understood that the various modules shown in FIG. 3 are a non-limiting conceptual division of the tasks performed by the object detection unit 23, and that other conceptual divisions may be employed to achieve the same effects described below.

Camera 21, which may be a vehicle mounted camera or a stationary camera obtains an image that comprises, e.g. comprises a visual representation of, at least part of the runway of taxiway surface. The resolution of the image is not limited, but in some cases the camera may be a 16 megapixel camera that obtains images with a resolution of 5320×3032 pixels. The image may then be split into a plurality of sub-images having a resolution of 640×640 pixels or 1300×1300 pixels, for example.

Figure 4:
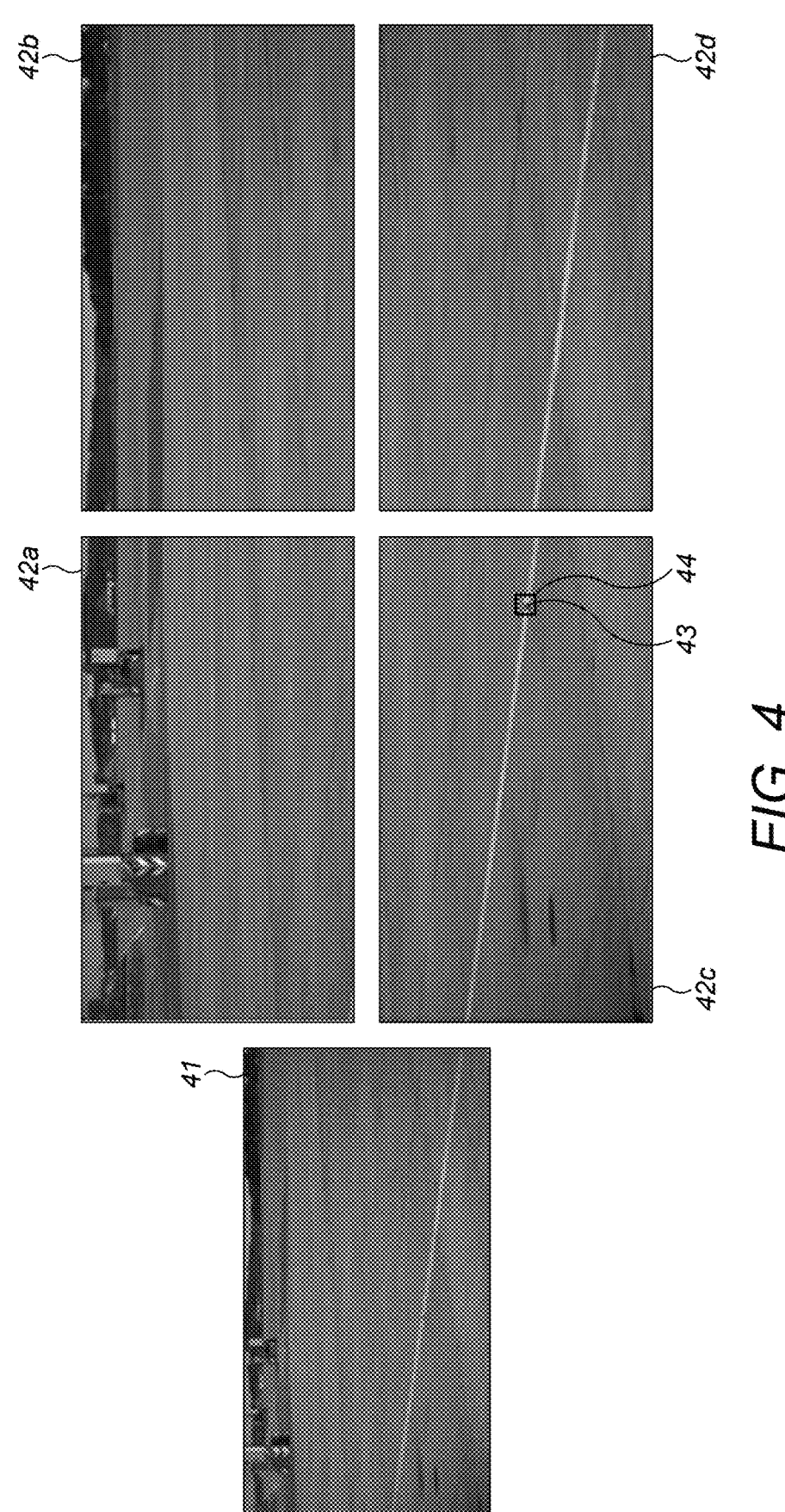
FIG. 4 illustrates how an image is split into a plurality of sub-images.

An example of splitting an input image into a plurality of sub-images is shown in FIG. 4. It can be seen that input image 41 is split into 4 sub-images 42a, 42b, 42c, and 42d. In this example, FOD 43 is present in sub-image 42c. Accordingly, a bounding box 44 is shown around the FOD 43.

Image to queue module 305 is communicatively connected to the camera 21 and encodes images from camera 21 into messages together with metadata associated with the image. The metadata is generated by the image to queue module 305 and may include a time of day, location on the runway that the image was taken, and the like.

Message preserver module 310 is communicatively connected to the image to queue module 305 and stores the encoded messages so that they can be distributed to different detection services if these are available. In the present disclosure, the message is passed from the message preserver module 310 to fod_image_queue module 315 where the image is temporarily held in a queue before being passed on to image_handler_fod module 320.

Image_handler_fod module 320 interfaces with a number of functions, three of which are represented by the runway segmenter module 325, fod_detector module 330 and known detector 340, which are each communicatively connected to the image_handler_fod module 320.

Before discussing the runway segmenter module 325, fod_detector module 330 and known detector 340, we first describe some other functions of the image_handler_fod module 320. The image_handler_fod module 320 may be configured to split the image into a plurality of sub-images, for example, 2, 3, 4, or more sub-images. The sub-images may then be processed further in a serial manner, or may alternatively be processed in parallel. This approach reduces the number of false positive results obtained by the detector because the detector has more pixels per area of the surface to work determine if FOD is present or not. For example, instead of downsampling the full 5320×3032 pixel image down to a resolution of 640×640 or 1300×1300 pixels, the full image may be split into 4 sub-images of the aforementioned resolution, which are then input to the zero-shot object detection model. In this way, more pixels are provided to the zero-shot object detection model per area, which reduces the number of false positive results.

Additionally, the image_handler_fod module 320 is able to detect and blur or obfuscate any human faces in the image. This is done by using a YOLO detector to find bounding boxes for any faces in the image. Then, pixels in the bounding boxes are set to (0, 0, 0), assuming an RGB colour space, which means that the faces are blacked out in the image. Of course, the pixels in the bounding box could be set to any suitable preset value that prevents features of the faces from being recognisable.

The runway segmenter module 325 comprises a machine learning model that detects where the runway/taxiway/apron areas are, and discards any FOD detections outside that area.

The runway segmenter module 325 is trained on annotated datasets of runways, taxiways and aprons, as seen in different lighting conditions, and so learns to determine where the runway, taxiway or apron is based on input data. After determining the regions of the image that correspond to the runway, taxiway or apron surface, bounding boxes falling outside those regions may be discarded. This reduces the overall amount of processing to be performed by taking detections that are not of interest out of the pipeline relatively early in the process. For example, if FOD is detected on the grass next to the taxiway, or in part of the image that represents the sky, then these detections are removed as they do not pose a hazard on the runway or taxiway surface.

The runway segmenter module 325 analyses the image pixel by pixel and divides the pixels of the image into two sets. The first set of pixels comprise pixels that represent the runway, taxiway or apron, while the second set of pixels comprising pixels that represent regions of the image other than the runway, taxiway and apron. For example, pixels that represent the sky, or the area adjacent to the surface my fall into the second set of pixels. It is to be noted that pixels sorted into first and second set need not be contiguous in the image. Rather, the first set of pixels it to be understood as a set or list of pixels that represent the surface, while the second set of pixels represents pixels that represent other than the surface. Following this approach, any candidate FOD detections made where all of the pixels relating the detection are in the second set of pixels, then the bounding box relating to the candidate FOD is discarded and not processed further. Similarly, if some or all pixels in the bounding box relating to a candidate FOD are in the first set of pixels, then this means that the candidate FOD is at least partially on the surface of the runway/taxiway/apron. Thus, such bounding boxes are processed further to determine if the candidate FOD is foreign object debris.

The fod_detector module 330 comprises a zero-shot object detection model, or in some examples, an open vocabulary object detection model. The image may be input to the fod_detector module in parallel with the runway segmenter module 325. However, this is not limited and the fod_detector module 330 can equally begin processing the image after or before the runway segmenter module 325 distinguishes pixels in the image that relate to the surface from pixels in the image that relate to other than the surface.

The zero-shot object detection model or open vocabulary detection model may be a known model such as YOLO World (https://arxiv.org/abs/2401.17270v3) or OV Dino (https://arxiv.org/abs/2407.07844v2) or any future model that provides same or similar functionality.

The zero-shot model is trained on a training set of general images, wherein after training the zero-shot object detection model, the zero-shot object detection model is configured to detect unseen instances of FOD, wherein unseen instances of FOD comprise instances of FOD absent in the training set. Some zero-shot object detection models are configured to detect only objects that were not seen during training. However, this is not the only approach, and a zero-shot model that detects seen as well as unseen classes is also referred to as a generalised zero-shot object detection model.

To elaborate on the training process, the untrained zero-shot object detection model is provided with a training data set containing images with supervised objects, i.e. having bounding boxes and class labels. Various training data sets exist and are known to the skilled person, such as MS COCOZSD and PASCAL VOCZSD. Additionally, training data may be generated over time using images generated by the vehicle of the disclosure.

Feature extraction is typically performed on the images to capture information such as object shape and texture. At this point, because the zero-shot model will be expected to identify instances of FOD not found in the training data at inference time, semantic embeddings are generated that link properties in the image to words or groups of words. Based on the semantic embeddings, the model then learns to associate visual features in an image with sematic descriptions, which effectively allows the model to recognise instances of FOD that were not seen in the training data. The model is able to do this because it has learned the underlying features of FOD, rather than relying on matching possible detections with examples seen during training.

Fine tuning can be performed on the zero-shot model after training, for example by using a technique such as Low-Rank Adaptation (LoRA) which freezes the weights of the original model and injects small, low-rank matrices into specific layers of the model architecture. Only the newly added matrices are updated during the fine-tuning, which reduces the number of trainable parameters, while still achieving comparable performance gains to full fine-tuning.

Using a zero-shot model therefore provides a solution for FOD detection in a dynamic and unpredictable runway environment where it is not practical to train a conventional computer vison algorithm to recognise every possible type of FOD. Instead, the zero-shot model learns the underlying features of FOD and is accordingly able to correctly identify previous unseen examples of FOD when these are encountered in the runway.

This idea can be taken further by using an open vocabulary detection (OVOD) model. An OVOD model is trained to align image features with textual embeddings which allows for detection of arbitrary objects. This is a powerful tool performing object detection on a runway because it is not limited to detecting objects that are semantically related to classes encountered during training. Rather, any class described in text can be detected in an image.

Unlike a zero-shot model, OVOD models are trained on large-scale image-text datasets such as CLIP, ALIGN and OWL-VIT. These datasets are known to the skilled person, and it would also be contemplated by the skilled person to use similar datasets that are generated in the future.

Another difference between an OVOD model and a zero-shot object detection model is that the OVOD model learns to align image regions with textual descriptions, rather than leading fixed class labels. This makes the OVOD model scalable to any class.

When a OVOD model is used, the fod_detector module 330 is provided with a list of classes which tells the OVOD model what to look for. The list of classes acts as a prompt that the OVOD model uses to search the image. The prompt can be a query such as "face", "large object on asphalt". "object on runway", "tiny object on ground". Specifying additional queries within the prompt will provide better results. Accordingly, complex queries can be engineered to provide better results.

After the fod_detector module 330 processes the image, the zero-shot object detection model outputs a list coordinates that correspond to bounding boxes, where each bounding box has a class (one of the input classes) and a probability, i.e. a likelihood that FOD is present in the bounding box. The likelihood may be a number between 0 and 1, or a percentage between 0% and 100%. If the likelihood is greater than a threshold value, then the image is passed to known detector module 340 via the image_handler_fod module 320. The threshold value can be tuned depending on the safety requirements of the runway. For example, for an ultra-safe approach, the threshold may be 0.01% or higher.

The bounding box is communicated to subsequent parts of the method as a protocol buffer message.

For an approach that balances safety and resource consumption of the vehicle (e.g. battery, processor time), while also limiting the number of false positive results, then the threshold may be higher, for example 1%. For an approach that focuses on resource conservation, a higher threshold may be used. The above examples of the threshold value are only provided as examples, and it is to be understood that the threshold value can be any number between 0 and 1 or percentage between 0% and 100%.

Figure 5:
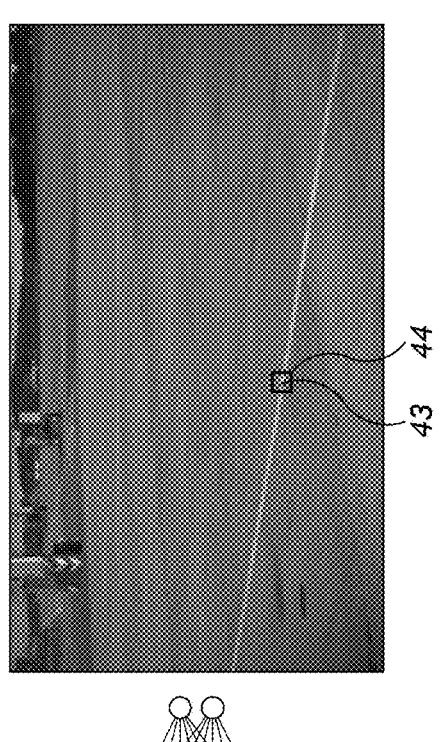
FIG. 5 schematically illustrates functionality provided by the zero-shot object detection model.
Figure 5:
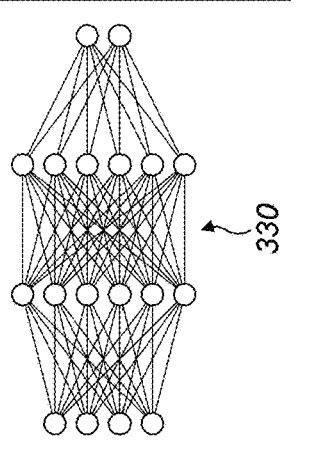
Figure 5:
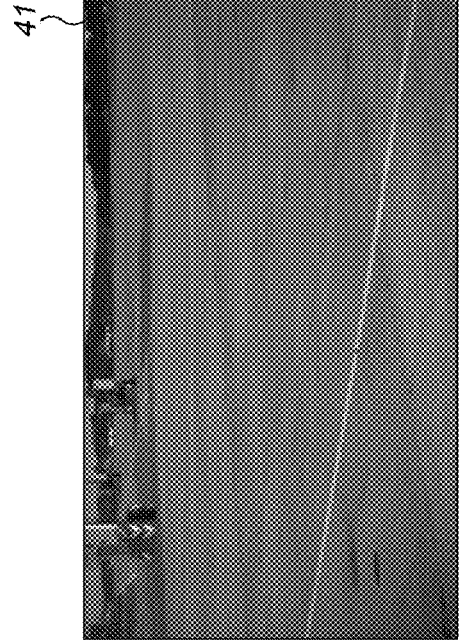

To summarise, as shown in FIG. 5, an input image 41 comprising at least part of a runway, taxiway or apron surface is input to a zero-shot object detection model 330. The zero-shot object detection model processes the image 41 and outputs co-ordinates of a bounding box around candidate FOD 43. For the sake of illustration, FIG. 5 shows a bounding box 44 drawn onto the input image. However, it is to be understood that the output from the zero-shot object detection model is a set of co-ordinates that represent a bounding box and a corresponding probability that FOD is present within the bounding box.

The output from the fod_detector module 330 is passed back to the image_handler_fod module 320. The image_handler_fod module 320 then determines the location of the FOD on the surface based on the center of the bounding box and a ray that passes through the focal point of the camera 21. Specifically, the co-ordinates of the bounding box are used to calculate the center of the bounding box, which is assumed to be the location of the candidate FOD in the bounding box. Then, a ray is traced from the focal point of the camera to the center of the bounding box in the imaginary image plane of the camera sensor of the camera 21. Assuming that the ground is flat, as is expected in a runway/taxiway/apron environment, then the intersection of the ray with the ground will correspond to the real-world position of the candidate FOD.

One challenge with using a zero-shot object detection model is that they can struggle to distinguish between a candidate detected object and the background behind the detected object. This can lead to the zero-shot object detection model reporting multiple bounding boxes which all relate to the same candidate FOD but with different amounts of background included in the detection. To resolve this problem, the image_handler_fod module 320 determines the innermost bounding box and discards the outer bounding boxes. The inner bounding box is kept because it provides the tightest fit to the FOD and therefore represents the most accurate detection of the FOD.

Another problem arises where objects are in close proximity, causing their respective bounding boxes to overlap or intersect. The overlap may be a partial overlapping or may be a total overlap, for example where one bounding box completely encompasses another.

The presence and extent of an overlap is determined based on the co-ordinates of the bounding boxes. That is, in a Cartesian co-ordinate system, the overlap may be determined based on corresponding co-ordinates of respective bounding boxes. An example is given below.

A first bounding box has co-ordinates:
top_left1=(left1, top1)
top_right1=(right1, top1)
bottom_left1=(left1, bottom1)
bottom_right1=(right1, bottom1).

A second bounding box has co-ordinates:
top_left2=(left2, top2)
top_right2=(right2, top2)
bottom_left2=(left2, bottom2)
bottom_right2=(right2, bottom2).

Alternatively, a bounding box can be parameterised by Cartesian co-ordinates (x_min, y_min), which represents a corner of the bounding box, together with the width and height of the bounding box. The other corners of the bounding box can be derived based on the given co-ordinates and the width and height.

The overlap or intersect between bounding boxes can be determined by comparing the coordinates of the first and second bounding boxes. There are many ways that this could be implemented, such as the following.

If any of the following statements are true, then it is determined that that the first bounding box does not overlap the second bounding box.

1) bottom1>top2

If condition 1 is true, then the first bounding box is completely above the second bounding box, and hence there is no overlap.

2) top1<bottom2

If condition 2 is true, then the first bounding box is completely below the second bounding box, and hence there is no overlap.

3) right1<left2

If condition 3 is true, then the first bounding box is completely to the left the second bounding box, and hence there is no overlap.

4) left1 >right2

If condition 4 is true, then the first bounding box is completely to the right the second bounding box, and hence there is no overlap.

In other words, if any one of the above conditions is not true, then the first bounding box overlaps with the second bounding box.

Another way of determining the overlap between bounding boxes is to calculate the intersection area and union area, then calculate the Intersection over Union (IOU) value. The intersection area is the area where the bounding boxes overlap. The union area is the combined area of both bounding boxes, considering the overlap. The union area is calculated by adding the areas of both bounding boxes and then subtracting the intersection area to avoid double-counting the overlapping region.

If the IOU value is above a threshold, then the bounding boxes are determined by be overlapping bounding boxes. Uses the IOU values allows the extent of the overlap to be quantified, which can facilitate tailored decision making in addressing overlapping bounding boxes.

Removing overlapping bounding boxes in favour of one bounding box that encompasses the candidate FOD detection in close proximity reduces additional processing due to the need to individually process the same part of the image twice, i.e. once for each overlapping bounding box. To address this issue, when two or more bounding boxes at least partially overlap or intersect, they are removed and replaced with one bounding box that encompasses all of the objects that had previously overlapping or intersecting bounding boxes. This reduces that amount of processing performed subsequently because all of the objects are treated as one object in a bounding box.

The boundary of the replacement bounding box may be determined based on the coordinates of the intersecting bounding boxes. For example, the coordinates that encompass both objects may be selected to form the replacement bounding box.

The image with the list of bounding box co-ordinates and probabilities is then passed to known detector module 340.

The known detector module 340 comprises a machine learning model that filters out objects that are expected to be on the runway.

Figure 6:
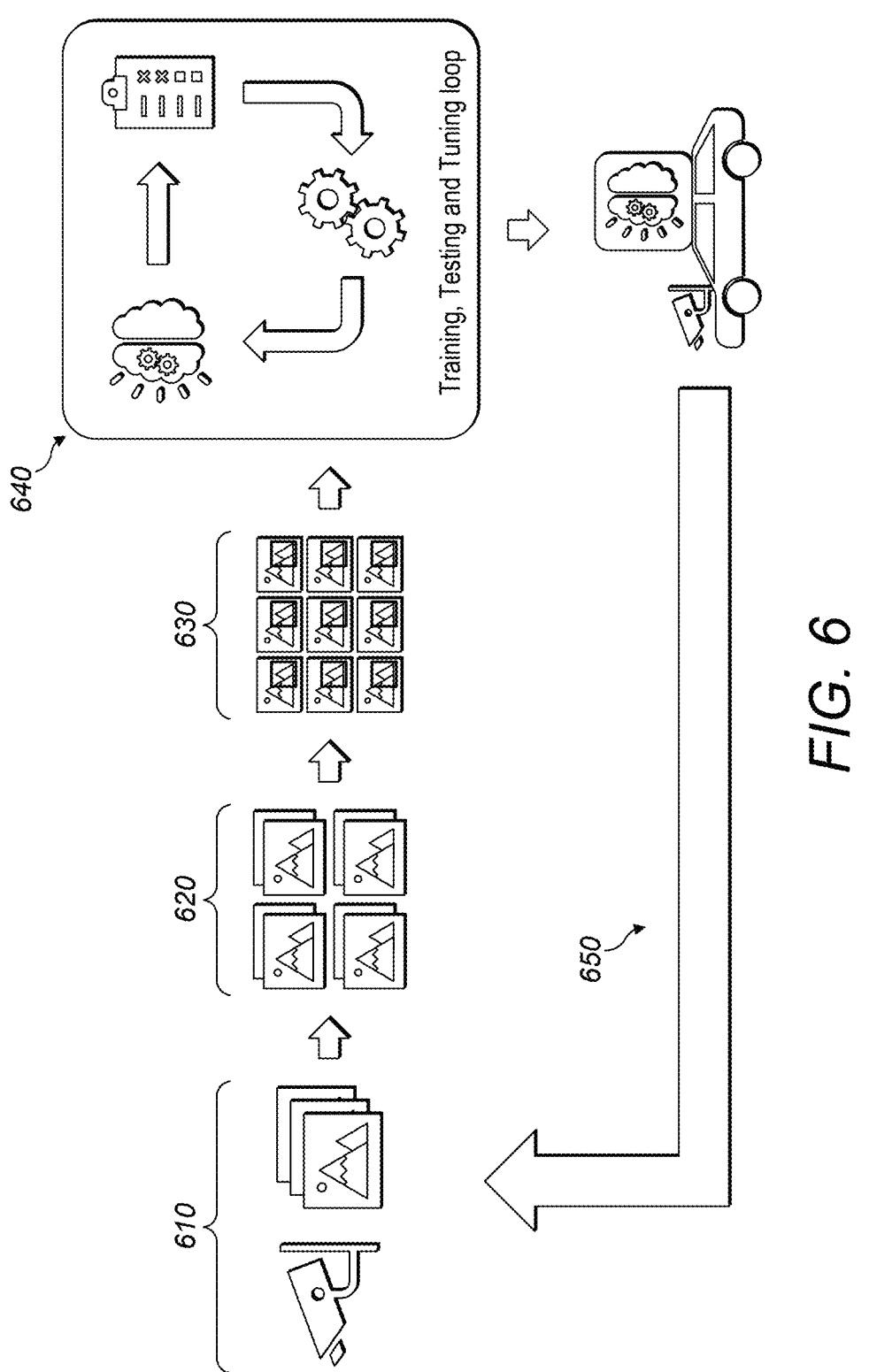
FIG. 6 pictorially illustrates how a known detector model is trained.

As conceptually illustrated in FIG. 6, the known detector module 340 is trained with a set of annotated training images that comprise objects which are expected to be present in the runway, taxiway and apron environment. In a first stage 610, the images may be collected via CCTV or other surveillance of the runway, taxiway and apron areas. In a second stage 620, image selection is performed to ensure model training encompasses diverse conditions, including different times of day, lighting situations, and weather patterns to improve model robustness. At stage 630, objects in the images which are expected to be present in the corresponding environment are then manually labelled so that the known detector module can be trained, tested and tuned at stage 640. When the model is deployed in object detection unit 300, the images gathered by the camera may also be used to collect additional data for further training, testing and tuning of the model, as indicated by arrow 650.

Figure 7:
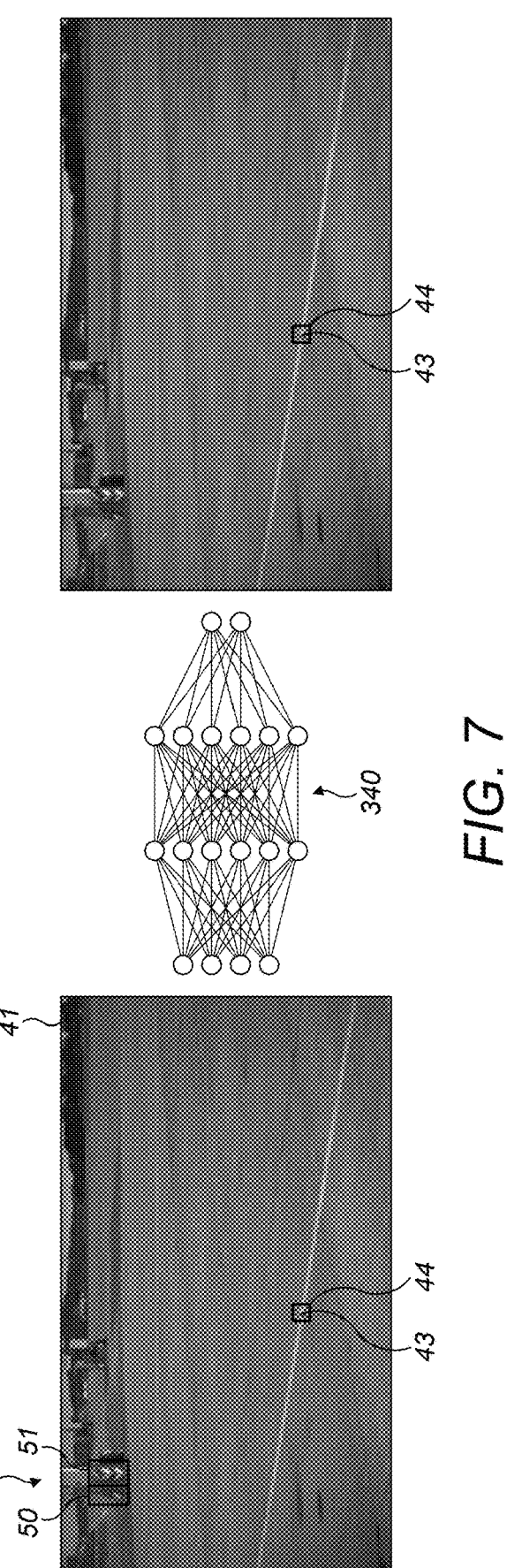
FIG. 7 schematically illustrates functionality provided by the known detector model.

As shown in FIG. 7, an example known object may be a fixed structure 52 on the surface of the runway. As shown in FIG. 7, co-ordinates of a bounding boxes 50 and 51 are output by the fod_detector module 330. Fixed structures 52 are accordingly regarded as candidate FOD. Image 41 is with bounding boxes 43, 50 and 51 is input to the known object detector 340. The known object detector removes the bounding boxes 50 and 51 that are around fixed structure 52 because it recognises that fixed structure 52 is expected to be present at that location of the runway. Bounding box 44 is not discarded by the known object detector 340, and therefore object 43 is considered as candidate FOD.

If the known object detector module 340 finds that the candidate detection does not match any of the known objects, then this means that the candidate FOD detection is foreign object debris. Unlike foreign object debris, there will be a set and limited number of known objects on a runway, so a conventional machine learning approach is sufficient to determine if a candidate FOD detection matches a known object.

In some examples where the camera is mounted to vehicle 100 and vehicle 100 includes a communications unit 40, on finding foreign object debris, it useful for a supervisor or operator of the vehicle to be notified as soon as possible. Accordingly, as shown by the two branches stemming from the image_handler_fod module 320 in FIG. 3, two result reporting pipelines are provided. The first pipeline includes the detection_wo_image_queue module 350, which is communicatively coupled to the image_handler_fod module 320. In the interest of reducing the time taken to alert the supervisor of the vehicle 100, the image_handler_fod module 320 obtains metadata from the image to queue module 305 that indicates that FOD is present on the surface of the runway or taxiway. The metadata is encoded into a message, which typically comprises fewer bits than the image, making it quicker to send than the image. The position of the FOD, as calculated by the image_handler_fod module 320 is also encoded into the message. The detection_wo_image_queue module 350 then sends the metadata message to the communications unit 40 to be sent to the supervisor's control station where it can be brought to the supervisor's attention.

In the second result reporting pipeline, the image with co-ordinates of the bounding box corresponding to the detecting FOD is sent to the detection results module 355. The detection results module 355 could send the entire image to the communications unit 40 so that it can be sent to a control station to be viewed by the supervisor. However, in doing do, irrelevant information is sent to the supervisor, because the supervisor would only be interested in the part or parts of the image that show FOD. Accordingly, to conserve bandwidth by stripping back the amount of irrelevant information sent to the supervisor, the image is sent to image cropper module 360 which cuts out the part of the image corresponding to the bounding boxes from the original high resolution version of the image, downscales the full image and sends the high resolution version of the bounding box overlaid onto the downscaled version of the full image. It will of course be appreciated that different downscale factors can be applied depending on how aggressively bandwidth is to be conserved.

The downscaling may be performed using the resize function from the python imaging library, PIL. The input to the function is the image and the desired output resolution.

The image cropper module 360 also draws visible bounding boxes onto the image based on the bounding box co-ordinates.

In this way, the supervisor is provided with the high resolution version of the part of the image where the FOD has been detected, i.e. the bounding box(es), whereas the rest of the image has been scaled down to save bandwidth.

Note that reporting the results of the detection to a supervisor in real-time is optional, and that it is contemplated that the vehicle 100 may autonomously collect the detected FOD without external supervisor input.

Figure 8:
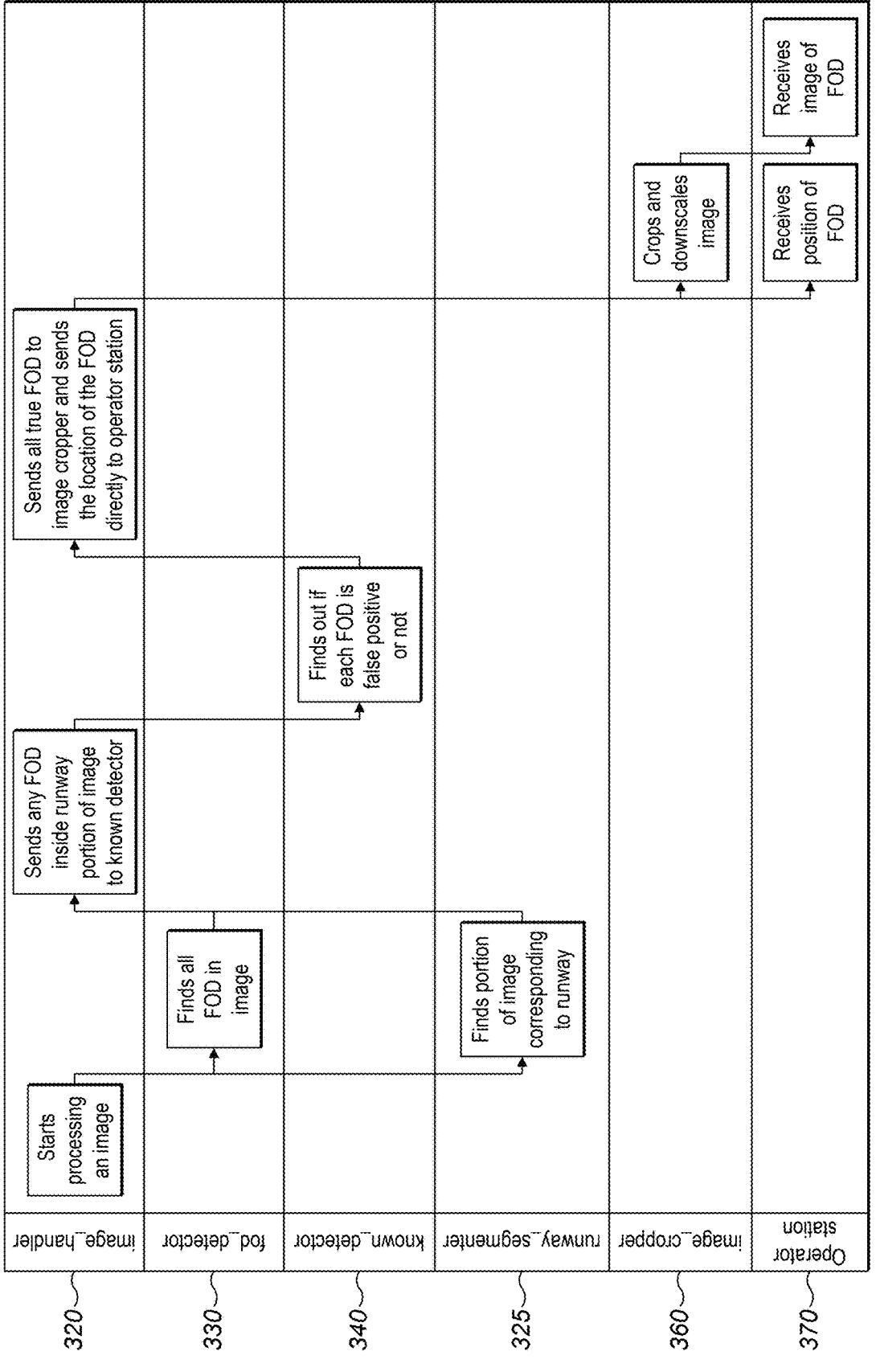
FIG. 8 provides a swim-lane diagram illustrating how different microservices interact, and the flow of data through the microservice architecture.

The above discussion relating to the passage of the input image is summarised according to the swim-lane diagram shown in FIG. 8.

Image_handler_fod module 320 receives an image and begins processing the image. The image is passed to the fod_detector module 330 and the runway segmenter module 325. In this example the image is passed to the fod_detector module 330 and the runway segment module 325 in parallel, but this need not be the case. Candidate detections, i.e. co-ordinates of bounding boxes and probabilities and the information relating to which parts of the image relate to the runway, taxiway or apron surface are passed back to the image_handler module 320.

Then, the image_handler module 320 sends the image, together with the candidate detections that are present in the region of the image corresponding to the surface, to the known_detector module 340. The known_detector module 340 determines which, if any, of the candidate detections relate to known objects that are expected to be present in the environment of the surface. Bounding boxes relating to known objects are filtered out, i.e. discarded, while bounding boxes that correspond to objects that do not match any known objects are sent back to image_handler 320.

Image_handler 320 encodes the location real-world of the detected FOD together with other metadata and sends this directly to the operator station 370 and the image cropper 360. The operator station 370 therefore receives an alert message with the location of the detected FOD before receiving a visual of the detected FOD.

Image cropper 360 partially crops and partially downscales the image (as discussed above), and send the partially downscaled image to the operator station 370.

Figures 9A, 9B, 9C:
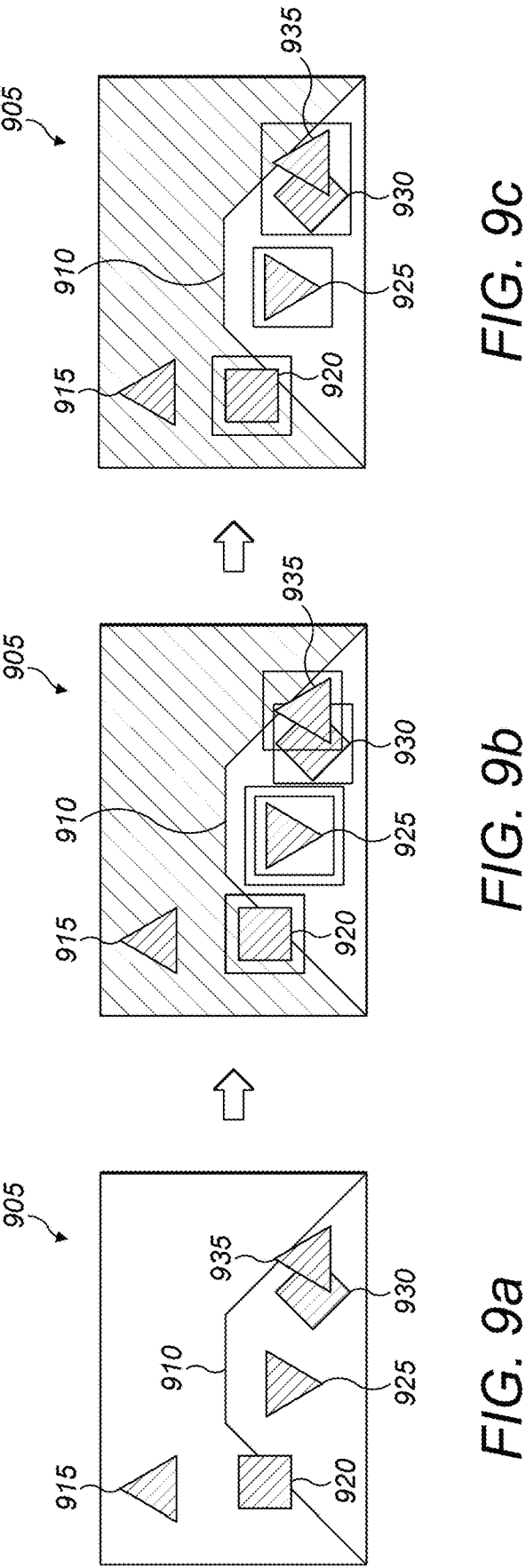
FIGS. 9a-9c schematically illustrates examples of image processing according to the disclosure, including how bounding boxes are added and adjusted after detecting objects in an image.

Turning now to FIGS. 9a to 9c, we provide some examples of image processing in accordance with the above.

In FIG. 9a, image 905 illustrates part of runway 910, and includes a plurality of objects 915, 920, 925, 930, and 935, which are represented by various shapes.

After the runway segmenter 325 processes the image, candidate FOD detections in the part of the image representing regions outside the runway are discarded, as represented by the shading in FIG. 9b. It can thus be seen that shape 915, which is entirely in the shaded region, will be excluded from further processing, because it represents an object which is not on the runway, and therefore is not a hazard and not of interest. Shape 920 is partly on the runway and partly off the runway, and therefore remains of interest.

As shown in FIG. 9b, fod_detector 330 detects objects 920, 925, 930 and 935, and image_handler_fod 320 draws bounding boxes accordingly. Object 915 is ignored as it is not on the runway surface. As can be seen, two bounding boxes are drawn around object 925 and the bounding boxes of objects 430 and 435 overlap.

As shown in FIG. 9c, image_handler_fod 320 performs additional processing to remove outer bounding box around object 925 and, replaces the two bounding boxes around objects 930 and 935 with a single bounding box.

Further processing can then be performed, such as cropping the parts of the image corresponding to the detections, downscaling the remaining parts of the image, and then overlaying the high resolution images of the detections onto the downscaled version of the image before sending the partially downscaled version of the image to the supervisor.

Figure 10:
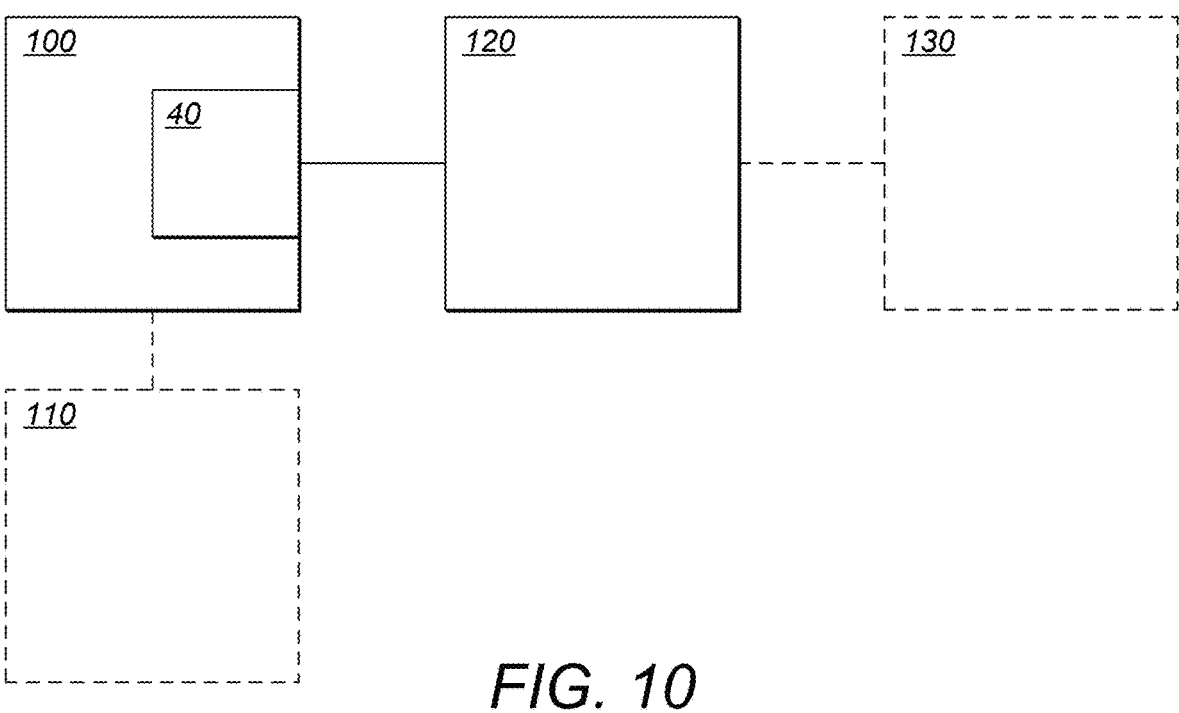
FIG. 10 schematically illustrates an example system for monitoring runway and taxiway conditions and performing runway and taxiway maintenance.

A system according to the disclosure is schematically illustrated by FIG. 10. Vehicle 100, is connected, via a wired or wireless connection to a remote server 120. The remote server 120 may be located in the airport of the runway or taxiway that the vehicle 100 is deployed on, but this is not essential. The remote server 120 may be configured to process and display the data, i.e. as a control station as discussed below. The processed data may be used to schedule a maintenance operation on the surface.

The system may also include a docking station 110 where the vehicle 100 can be docked when not in use. The docking station 110 is illustrated using a dashed line to indicate that it is not always part of the system. The docking station 110 can provide various functionality, such as charging the vehicle 100.

The docking station 110 may also include a transceiver configured to upload data, for example image data relating to detections made in a previous operating session, to the remote server. The remote server may store the data or perform further analysis.

In terms of charging, the vehicle 100 may connect inductively with the docking station 110 by aligning a coil included in the vehicle 100 with a coil included in the docking station 110. This is a particularly useful mode of charging the vehicle 100, since it removes the need for personnel to attend the docking station 110 to connect the docking station 120 to the vehicle 100.

The system optionally further comprises a control station 130. The control stations typically includes a graphical user interface (GUI), a control interface, and a transceiver unit configured to communicate with vehicle 100 via remote server 120. The control station 130 allows a human supervisor to oversee operations of the vehicle 100 at a distance, and also to control the vehicle 100 when needed.

The GUI may show the supervisor various views around the vehicle 100 using camera 21. The GUI enables the supervisor to schedule work orders for execution, to start and stop execution of all scheduled work orders, and to process the results of the executed work orders. The processing of results includes approving or dismissing any findings of FOD, comment on them, classify them as different types of false positives, and finally to finalize a mission, which leads to all the work orders being closed in the maintenance system and any findings of FOD being given a corrective work order. A corrective work order is a work package for the airport or runway operator to fix the issue, like collecting the FOD.

Further, the control interface allows the supervisor to control any aspect of the vehicle, such as steering, speed, adjusting cameras, activating sensors, and performing maintenance or wildlife repelling operations.

Figure 11:
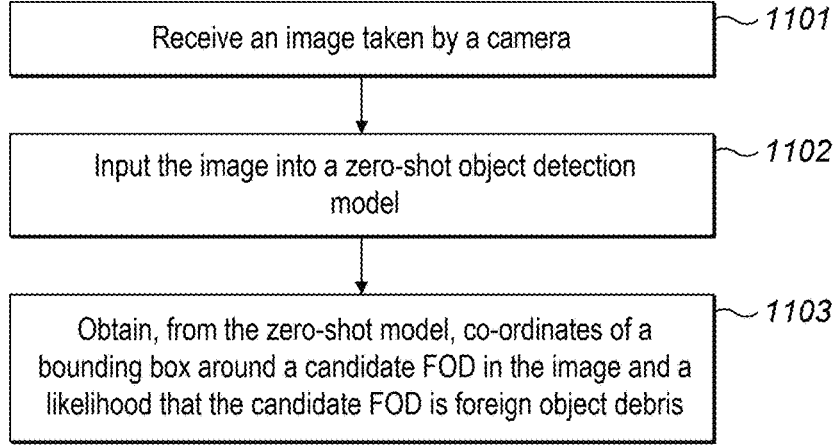
FIG. 11 schematically illustrates an example method of monitoring runway and taxiway conditions.

A method for monitoring runway or taxiway conditions according to the disclosure is illustrated by FIG. 11. The method is performed by the object detection unit 23 described above, which may be located on the vehicle 100 or remotely from the vehicle 100. If the object detection unit 23 is remote from vehicle 100 then object detection unit 23 is communicated with via the communications unit 40 of the vehicle. At step 1101, an image taken by a camera is received. The image comprises at least part of the runway surface, taxiway surface or apron surface. At step 1102 the image is input to a zero-shot object detection model, wherein the zero-shot object detection model is configured to output co-ordinates of a bounding box around a candidate FOD in the image and determine a likelihood that FOD is present in the bounding box. At step 1103, co-ordinates of a bounding box around a candidate FOD in the image and a likelihood that the candidate FOD is foreign object debris are obtained from the zero-shot object detection model.

In conclusion, the disclosure provides an object detection unit for monitoring runway and taxiway surface conditions which is configured with a zero-shot object detection model that detects instances of FOD on the runway or taxiway even if it did not encounter that type of FOD during training. This allows the object detection unit to be effective at detecting FOD in the unpredictable and dynamic environment of a runway, taxiway or apron, whereas previously it was not practical to use a machine learning approach for this task, since it was not practical to train the machine learning algorithm on every possible type of FOD that could be encountered. The zero-shot model learns the underlying features of FOD, and therefore does away with this limitation.

The invention claimed is:

1. An object detection unit for detecting thea presence of foreign object debris (FOD) on a surface of a runway, taxiway or apron, the object detection unit comprising a processor, the object detection unit configured to:

receive an image taken by a camera, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box;

obtain, from the zero-shot object detection model, co-ordinates of a bounding box around a candidate FOD in the image and a likelihood that the candidate FOD is foreign object debris; and determine if the likelihood exceeds a threshold value, wherein when the likelihood exceeds the threshold value, the object detection unit is further configured to:

locate a center of the bounding box based on the co-ordinates of the bounding box;

trace a ray from a focal point of the camera to the center of the bounding box in an imaginary image plane of a sensor of the camera; and determine a position of the candidate FOD on the surface based on an intersection of the ray with the surface.

2. The object detection unit of claim 1, wherein when the likelihood exceeds the threshold value, the object detection unit is configured to:

compare a region of the image inside the bounding box to a set of known objects; and either:

determine that the candidate FOD matches a known object and discard the bounding box; or determine that the candidate FOD does not match a known object.

3. The object detection unit of claim 1, wherein the object detection unit is further configured to:

divide the image into a first set of pixels and a second set of pixels, the first set of pixels comprising pixels that represent the runway, taxiway or apron, the second set of pixels comprising pixels that represent regions of the image other than the runway, taxiway and apron; and discard the bounding box when pixels in the bounding box consist of pixels in the second set of pixels.

4. The object detection unit of claim 1, wherein the foreign object debris comprises a plurality of objects, and the object detection unit is configured to:

output co-ordinates of a respective bounding box around each candidate FOD in the image, wherein at least two bounding boxes around two separate candidate FODs intersect, and the object detection unit is further configured to:

replace the intersecting bounding boxes with one bounding box around the candidate FODs.

5. The object detection unit of claim 2, wherein when object detection unit determines that the candidate FOD does not match a known object, the object detection unit is configured to:

determine that the candidate FOD is foreign object debris;

send an alert comprising metadata associated with the image to a control station of a vehicle for monitoring and reporting runway, taxiway and apron surface conditions;

draw, based on the co-ordinates of the bounding box, a bounding box around the foreign object debris in the image;

downscale regions of the image outside the bounding box to create a partially downscaled version of the image; and send the partially downscaled version of the image to the control station of the vehicle.

6. The object detection unit of claim 1, wherein the object detection unit is further configured to:

split the image into a plurality of sub-images;

wherein inputting the image to the zero-shot object detection model comprises inputting each of the plurality of sub-images to the zero-shot object detection model.

7. The object detection unit of claim 1, wherein the object detection unit is further configured to:

scan the image for human faces;

locate a human face in the image; and set values of pixels corresponding to the human face to a preset value.

8. The object detection unit according to claim 1, wherein the zero-shot object detection model is trained on a set of training images, wherein after training the zero-shot object detection model the zero-shot object detection model is configured to detect unseen instances of FOD, wherein unseen instances of FOD comprise instances of FOD absent in the set of training images.

9. The object detection unit of claim 1, wherein the zero-shot object detection model comprises an open vocabulary detection model, wherein a text prompt is provided to the open vocabulary detection model, the text prompt comprising a description of an object, and the open vocabulary detection model is configured to detect an object in the image that matches the description of the object.

10. A vehicle for monitoring runway, taxiway and apron surface conditions and remotely reporting a status of the runway, taxiway or apron, the vehicle comprising a detection unit, and a communications unit, the detection unit comprising:

an object detection unit;

a processor; and a camera configured to obtain an image of at least part of the surface, the object detection unit comprising a processor, the object detection unit configured to:

receive an image taken by the camera, the image comprising at least part of the runway surface, taxiway surface or apron surface, input the image to a zero-shot object detection model, wherein the zero-shot object detection model is configured to output co-ordinates of a bounding box around a candidate FOD in the image and determine a likelihood that FOD is present in the bounding box;

obtain, from the zero-shot object detection model, co-ordinates of a bounding box around a candidate FOD in the image and a likelihood that the candidate FOD is foreign object debris; and determine if the likelihood exceeds a threshold value, wherein when the likelihood exceeds the threshold value, the object detection unit is configured to:

compare a region of the image inside the bounding box to a set of known objects; and either:

determine that the candidate FOD matches a known object and discard the bounding box; or determine that the candidate FOD does not match a known object, and wherein when the object detection unit determines that the candidate FOD does not match a known object, the object detection unit is configured to:

determine that the candidate FOD is foreign object debris;

send an alert comprising metadata associated with the image to a control station of a vehicle for monitoring and reporting runway, taxiway and apron surface conditions;

draw, based on the co-ordinates of the bounding box, a bounding box around the foreign object debris in the image;

downscale regions of the image outside the bounding box to create a partially downscaled version of the image; and send the partially downscaled version of the image to the control station of the vehicle.

11. A method of monitoring aerodrome runway, taxiway and apron conditions, the method performed by an object detection unit, the method comprising the steps of:

receiving an image taken by a camera, the image comprising at least part of a surface of the runway, taxiway or apron;

inputting the image to a zero-shot object detection model, wherein the zero-shot object detection model is configured to output co-ordinates of a bounding box around a candidate FOD in the image and determine a likelihood that FOD is present in the bounding box;

obtaining, from the zero-shot object detection model, co-ordinates of a bounding box around a candidate FOD in the image and a likelihood that the candidate FOD is foreign object debris; and determining if the likelihood exceeds a threshold value, wherein when the likelihood exceeds the threshold value, the method further comprises:

locating a center of the bounding box based on the co-ordinates of the bounding box;

tracing a ray from a focal point of the camera to the center of the bounding box in an imaginary image plane of a sensor of the camera; and determining a position of the candidate FOD on the surface based on an intersection of the ray with the surface.

12. The method of claim 11, wherein when the likelihood exceeds the threshold value, the method further comprises:

comparing a region of the image inside the bounding box to a set of known objects; and either:

determining that the candidate FOD matches a known object and discard the bounding box; or determining that the candidate FOD does not match a known object.

13. The method according to claim 11, further comprising:

dividing the image into a first set of pixels and a second set of pixels, the first set of pixels comprising pixels that represent the runway, taxiway or apron, the second set of pixels comprising pixels that represent regions of the image other than the runway, taxiway and apron; and discarding the bounding box when pixels in the bounding box consist of pixels in the second set of pixels.

14. The method of claim 11, wherein the foreign object debris comprises a plurality of objects, and the method further comprises:

outputting co-ordinates of a respective bounding box around each candidate FOD in the image, wherein at least two bounding boxes around two separate candidate FODs intersect; and replacing the intersecting bounding boxes with one bounding box around the candidate FODs.

15. The method of claim 12, wherein when the candidate FOD does not match a known object, the method further comprises:

determining that the candidate FOD is foreign object debris;

sending an alert comprising metadata associated with the image to a control station of a vehicle for monitoring and reporting runway, taxiway and apron surface conditions;

drawing, based on the co-ordinates of the bounding box, a bounding box around the foreign object debris in the image;

downscaling regions of the image outside the bounding box to create a partially downscaled version of the image; and sending the partially downscaled version of the image to the control station of the vehicle.

16. The method of claim 11, further comprising:

splitting the image into a plurality of sub-images;

wherein inputting the image to the zero-shot object detection model comprises inputting each of the plurality of sub-images to the zero-shot object detection model.

17. The method of claim 11, further comprising:

scanning the image for human faces;

locating a human face in the image; and setting values of pixels corresponding to the human face to a preset value.

18. The method of claim 11, wherein the zero-shot object detection model comprises an open vocabulary detection model, wherein a text prompt is provided to the open vocabulary detection model, the text prompt comprising a description of an object, and the open vocabulary detection model is configured to detect an object in the image that matches the description of the object.

19. A method of monitoring aerodrome runway, taxiway and apron conditions, the method performed by an object detection unit, the method comprising the steps of:

receiving an image taken by a camera, the image comprising at least part of a surface of the runway, taxiway or apron;

inputting the image to a zero-shot object detection model, wherein the zero-shot object detection model is configured to output co-ordinates of a bounding box around a candidate FOD in the image and determine a likelihood that FOD is present in the bounding box;

obtaining, from the zero-shot object detection model, co-ordinates of a bounding box around a candidate FOD in the image and a likelihood that the candidate FOD is foreign object debris; and determining if the likelihood exceeds a threshold value, wherein when the likelihood exceeds the threshold value, the method further comprises:

comparing a region of the image inside the bounding box to a set of known objects; and either:

determining that the candidate FOD matches a known object and discard the bounding box; or determining that the candidate FOD does not match a known object, and wherein when the candidate FOD does not match a known object, the method further comprises:

determining that the candidate FOD is foreign object debris;

sending an alert comprising metadata associated with the image to a control station of a vehicle for monitoring and reporting runway, taxiway and apron surface conditions;

drawing, based on the co-ordinates of the bounding box, a bounding box around the foreign object debris in the image;

downscaling regions of the image outside the bounding box to create a partially downscaled version of the image; and sending the partially downscaled version of the image to the control station of the vehicle.

* * * * *